(12) United States Patent
Velamakanni et al.

(10) Patent No.: US 10,066,103 B2
(45) Date of Patent: Sep. 4, 2018

(54) TIRE WITH BORON NITRIDE REINFORCED POLYURETHANE

(71) Applicant: The Goodyear Tire & Rubber Company, Akron, OH (US)

(72) Inventors: Aruna Mani Velamakanni, Copley, OH (US); Anthony Ryan Lame, Streetsboro, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/669,223

(22) Filed: Aug. 4, 2017

(65) Prior Publication Data

US 2017/0335103 A1    Nov. 23, 2017

Related U.S. Application Data

(62) Division of application No. 14/700,766, filed on Apr. 30, 2015, now abandoned.

(60) Provisional application No. 62/086,214, filed on Dec. 2, 2014.

(51) Int. Cl.

| | |
|---|---|
| *C08L 75/06* | (2006.01) |
| *C08K 3/38* | (2006.01) |
| *C08K 5/11* | (2006.01) |
| *B60C 1/00* | (2006.01) |
| *C08K 3/013* | (2018.01) |

(52) U.S. Cl.
CPC ............... *C08L 75/06* (2013.01); *B60C 1/00* (2013.01); *C08K 3/013* (2018.01); *C08K 3/38* (2013.01); *C08K 5/11* (2013.01); *C08G 2380/00* (2013.01); *C08K 2003/385* (2013.01)

(58) Field of Classification Search
CPC ....................................................... C08L 75/06
USPC .......................................................... 524/701
See application file for complete search history.

(56) References Cited

U.S. PATENT DOCUMENTS

| | | | |
|---|---|---|---|
| 3,980,606 A | 9/1976 | Werner | |
| 4,071,279 A * | 1/1978 | Chung | .................. B29D 30/02 152/311 |
| 4,095,637 A | 6/1978 | Krishnan | |
| 4,131,667 A | 12/1978 | Lovell et al. | |
| 4,295,513 A | 10/1981 | Lovell et al. | |
| 5,422,385 A | 6/1995 | Farkas | |
| 8,662,122 B2 | 3/2014 | Benzing, II | |
| 8,735,487 B2 | 5/2014 | Matthiesen et al. | |
| 2010/0000650 A1 * | 1/2010 | Matthiesen | ........... B60C 1/0016 152/525 |

* cited by examiner

*Primary Examiner* — Doris L Lee
(74) *Attorney, Agent, or Firm* — Henry C. Young, Jr.

(57) ABSTRACT

This invention relates to a vehicular tire containing at least one boron nitride reinforced polyurethane component. The polyurethane component is a cast polyurethane containing a dispersion of a layered hexagonally crystalline boron nitride (h-BN) particles. The polyurethane is the product of a castable liquid polyurethane reaction mixture derived from polyisocyanate and polymeric polyols without containing carbon-to-carbon bonds as distinguished from carbon-to-carbon double bond containing millable, sulfur curable, polyurethanes. It may sometimes be referred to as being a cast polyurethane.

4 Claims, No Drawings

TIRE WITH BORON NITRIDE REINFORCED POLYURETHANE

FIELD OF THE INVENTION

This invention relates to a vehicular tire containing at least one boron nitride reinforced polyurethane component. The polyurethane component is a cast polyurethane containing a dispersion of a layered hexagonally crystalline boron nitride (h-BN) particles. The polyurethane is the product of a castable liquid polyurethane reaction mixture derived from polyisocyanate and polymeric polyol without containing carbon-to-carbon double bonds as distinguished from carbon-to-carbon double bond containing millable, sulfur curable, polyurethanes. It may sometimes be referred to as being a cast polyurethane.

BACKGROUND OF THE INVENTION

Various vehicular tires have been proposed which are composed of, or contain a component composed of, polyurethane. The polyurethane is typically the reaction product of an organic polyisocyanate and polymeric polyol, or reaction product of polyamine and isocyanate terminated pre-polymer of polyisocyanate and polymeric polyol.

The polyurethane is a cast polyurethane in a sense of being the product of casting a liquid polyurethane reaction mixture into a suitable mold cavity and allowing the liquid reaction mixture to react within the mold and form the molded polyurethane product without being sulfur or peroxide cured. The cast polyurethane for this invention does not contain an unsaturated hydrocarbon component and is there not susceptible to sulfur vulcanization.

The cast polyurethane for this invention is intended to be distinguished from and exclusive of a millable polyurethane composed of a product of a polyurethane reaction mixture containing unsaturated hydrocarbon component(s) which is sulfur or peroxide cured.

When the cast polyurethane is a reaction product of polyamine and isocyanate terminated pre-polymer which might more appropriately be referred to as a polyureaurethane, it is referred herein in more general terms as being a polyurethane.

Exemplary of such tires composed of or containing polyurethanes are, for example, and not intended to be limitive, U.S. Pat. No. 4,095,637 relating to a solid polyurethane tire/wheel assembly and U.S. Pat. Nos. 4,295,513, 4,131,667 and 8,662,122 in general.

In practice, tires are generally subject to dynamic flexing during their service and operation. For tires which are composed of or which contain a component comprised of polyurethane, it is sometimes desired to provide reinforcement for polyurethane. Here, it is desired to evaluate use of particulate boron nitride in a form of a composite of hexagonal boron nitride platelets, or h-BN, for providing reinforcement for the polyurethane.

Historically, tires have been proposed having vulcanizable rubber components containing a dispersion of boron nitride to promote improved heat transfer and having an innerliner with resistance to air permeability containing a dispersion of boron nitride. Such vulcanizable rubber components are composed of rubbery polymers or elastomers that are capable of being crosslinked or vulcanized. Such polymers are said to include, but not limited to synthetic polymers such as synthetic polyisoprene, polybutadiene, polysulfide rubber acrylic rubber, urethane rubber and silicone rubber. For example, see U.S. Pat. No. 8,735,487.

Boron nitride is a chemical compound with a chemical formula represented as BN which consists of equal numbers of boron and nitrogen atoms which exists in various crystalline forms. The hexagonal form (which may sometimes be referred to herein as h-BN) is a layered boron nitride configuration which is composed of hexagonal crystalline stacked layers and is considered to be a stable form which exhibits good thermal and chemical stability. It is sometimes used as an additive in various lubricant and cosmetic products. It has been used in rubber compositions for various purposes. As indicated, it is desired to evaluate the h-BN for use as a particulate reinforcement for polyurethane.

It is envisioned that hydrogen bond linkages can be created between the h-BN and isocyanate of the polyurethane reaction mixture which can thereby promote reinforcement of the polyurethane for improvement of one or more of its physical properties.

Optionally, a desiccant such as dry molecular sieves may be blended with one or more of the h-BN, polymeric polyol and polyamine to promote removal of moisture or to prevent moisture interference with the polyurethane reaction mixture.

Therefore, in one embodiment of the invention, a desiccant in a form of dried molecular sieves may be mixed with, or together with, at least one of the h-BN, polymeric polyol and polyamine and then mixed with a polyisocyanate to create a moisture free polyurethane reaction mixture. In such case, the ultimate polyurethane product will contain the molecular sieves.

SUMMARY AND PRACTICE OF THE INVENTION

A toroidal (shaped) tire is provided comprised of or as containing at least one component comprised of polyurethane containing a dispersion of layered hexagonally crystalline boron nitride particulate (h-BN) reinforcement, where the polyurethane may also optionally contain a dispersion of molecular sieve desiccant, wherein the polyurethane is the product of a reaction mixture of:

(A) organic polyisocyanate and polymeric polyol, or (B) primary aliphatic polyamine, desirably a diamine, and pre-polymer of isocyanate terminated product of organic polyisocyanate and polymeric polyol, wherein said polymeric polyol is comprised of at least one of polyester polyol and polyether polyol, desirably a polyester polyol, wherein the h-BN dispersion is desirably present in an amount of from about 0.1 to about 5, alternately from about 1 to about 5, weight percent of the polyurethane, wherein the polymeric polyol is free of carbon-to-carbon double bonds.

In practice, the primary aliphatic diamine may be comprised of 4,4'-methylene dianiline.

In one embodiment, said polyurethane contains a particulate molecular sieve desiccant.

In further accordance with this invention, a method of preparing a particulate layered hexagonally crystalline boron nitride (h-BN) reinforced polyurethane comprises:

(A) preparing a polyurethane reaction mixture by:
(1) blending h-BN with polymeric polyol comprised of at least one of polyether polyol and polyester polyol, desirably a polyester polyol, to form a composite thereof followed by blending an organic polyisocyanate with said composite, or (2) blending h-BN with an isocyanate terminated prepolymer of organic polyisocyanate and polymeric polyol comprised of at least one of polyether polyol and polyester polyol, desirably a polyester polyol, to form a composite thereof, followed by blending a primary aliphatic amine said composite, and (B) Allowing said polyurethane reaction mixture to react to from a polyurethane product containing a dispersion of h-BN reinforcement wherein said polymeric polyol is free of carbon-to-carbon double bonds.

In one embodiment, for said method, from about 0.1 to about 5, alternately from about 1 to about 5, parts by weight of the h-BN is provided as a dispersion within the polyurethane product.

In one embodiment, the method comprises providing or blending a plasticizer with said polymeric polyol to promote processing of the polymeric polyol. Such plasticizer may be, for example, an aliphatic adipate containing from 8 to about 20 carbon atoms, such as for example, dioctyl adipate.

In one embodiment, said method comprises blending a desiccant (e.g. molecular sieves) with said polymeric polyol and/or diamine to promote moisture removal therefrom.

In further accordance with this invention, a polyurethane reaction mixture is provided as being prepared by such method.

In one embodiment, said method comprises casting (for example by injecting) said polyurethane reaction mixture into a suitable mold cavity and allowing said polyurethane reaction mixture to react to form a polyurethane containing a dispersion of said h-BN comprised of an article of manufacture such as, for example, at least one of a tire and tire component.

In additional accordance with this invention, an article of manufacture, such as, for example, at least one of a tire and tire component comprised of a polyurethane containing a dispersion of d-BN, is provided particularly as prepared by such method.

In one embodiment, the polymeric polyol has a hydroxyl functionality of from about 2 to about 3.

In one embodiment, the polymeric polyester polyol may be a product of dicarboxylic acid having from about 4 to about 10 carbon atoms and hydroxyl terminated hydrocarbon diol having from 2 to 8 carbon atoms which may be, for example, a condensation product of glycols and organic polycarboxylic acid or anhydride.

Representative low molecular weight polyols for the preparation of the polyester polyols are, for example, glycols such as ethylene glycol, propylene glycol, butylene glycol, pentylene glycol, decamethylene glycol, etc. Representative examples of the organic dicarboxylic acids may be, for example, succinic acid, glutaric acid, adipic acid, phthalic acid, terephthalic acid, isophthalic acid, suberic acid, sebacic acid, pimelic acid, and azelaic acid. The anhydrides of such acids might be used in place of the acid if desired and appropriate. If desired, from about one to 20 percent by weight of a triol or higher polyfunctional polyol or polyfunctional acid can be present to promote branching in the polyurethane polymer itself if desired and appropriate.

In one embodiment, the polymeric polyether polyol may be a product of at least one of alkylene oxides and alkylene glycols. Such polyether polyols might be prepared, for example, by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or optionally with a polycarboxylic acid such as phthalic acid. The polyether polyols include polyalkylene-aryl ether glycols or triols, polytetramethylene ether glycols, polyalkylene ether-thioether glycols or triols and alkyd resins. Generally the polytetramethylene ether glycols are preferred polyether glycols.

Representative of various diamines for reaction with said pre-polymer of isocyanate terminated polymeric polyol is, for example, 4,4'-methylene dianiline as previously mentioned.

The polyurethane reaction mixtures are generally applied as liquid mixtures so that, where appropriate, the polymeric polyol may be pre-heated to create a liquid mixture.

In one embodiment, the polymeric polyols may have a molecular weight, for example, of from about 1,200 to about 1,400 Daltons.

In one embodiment, the organic polyisocyanates include various organic diisocyanates and mixtures thereof. The organic polyisocyanates may be aromatic, aliphatic or cycloaliphatic or combinations of these types, depending upon the type resultant polyurethane desired.

Representative examples of such polyisocyanates may be, for example, the toluene diisocyanates (TDI), m-phenylene diisocyanate, 4-chloro-1,3-phenylene diisocyanate, 4,4'-tetramethylene diisocyanate (MDI), 1,6-hexamethylene diisocyanate, 1,10-decamethylene diisocyanate, 1,4-cyclohexylene diisocyanate, 4,4'-methylene-bis(cyclohexylisocyanate) and 1,5-tetrahydronaphthalene diisocyanate, and mixtures of such diisocyanates as may be desired or appropriate.

The MDI is understood to exist in three isomers, namely 2,2-MDI, 2,4-MDI and 4,4-MDI and is understood to be generally provided commercially as at least 98 percent 4,4-MDI with a small 2,4-MDI content which may sometimes be referred to as "pure MDI".

The TDI is generally commercially provided as a mixture of 2,4- and 2,6-isomers in a form of an 80:20 blend thereof, also in a form of a 63:35 blend or 95:5 blend of the two isomers.

The toluene diisocyanates (TDI), diphenylmethane-4,4'-diisocyanate (MDI), 3,3'-dimethyl-4,4'-bis phenylene diisocyanate (TODI) and 4,4'-methylene bis(cyclohexyl isocyanate) ($H_{12}$MDI) are generally desired where appropriate, with the TDI and MDI being more generally desirable.

Various nonreactive solvents known to those skilled in the polyurethane art can be used for the preparation of the polyurethane reaction mixtures, if a solvent is desired and appropriate. Representative of the solvents are, for example, aromatic solvents such as benzene, xylene and toluene, and the liquid lower ketones such as acetone, methyl ethyl ketone, methyl isobutyl ketone, and diisobutyl ketone. If the polyurethane reaction mixtures are to be used to prepare the cured polyurethanes in confined areas which are subject to explosive hazards, nonflammable chlorinated solvents can be used to form nonflammable polyurethane reaction mixtures.

The practice of this invention is further illustrated by reference to the following examples which are intended to be representative rather than restrictive of the scope of the invention. Unless otherwise indicated, the parts and percentages are by weight of the polyurethane.

EXAMPLE I

Polyurethane reaction mixtures are prepared to evaluate an inclusion of a dispersion of particulate h-BN in a polyurethane from a polyurethane reaction mixture comprised of polymeric polyester polyol and polyisocyanate.

For the h-BN containing polyurethane, the polymeric polyester polyol was blended with the h-BN, dry molecular sieve desiccant (to promote moisture removal) and dioctyladipate plasticizer (to reduce viscosity of the blend). The resulting blend was degassed under vacuum to remove any residual moisture. The polyisocyanate is separately degassed under vacuum.

The blend was then blended with the polyisocyanate (MDI) to form a polyurethane reaction mixture which was cast into a suitable mold and the polyurethane reaction mixture allowed to react to form a molded (shaped) h-BN reinforced polyurethane sample.

For this evaluation, a control sample of polyurethane reaction mixture was prepared comprised of reacting a liquid reaction mixture without the h-BN comprised of polymeric polyester polyol (together with molecular sieve desiccant) and polyisocyanate and to form a polyurethane product.

Experimental rubber Samples B through F were prepared with the polymeric polyol and polyisocyanate of control rubber Sample A (together with the molecular sieves desiccant) together with from 2 to 5 parts of the particulate h-BN having been added to the polymeric polyol. The h-BN was blended with the polymeric polyol together with the desiccant of molecular sieves prior to adding the polyisocyanate to form the polyurethane reaction mixture.

The components of the polyurethane reaction mixture are reported in the following Table 1 in terms of parts by weight per 100 parts by weight of the polyurethane (polymeric polyol and diisocyanate), (php), unless otherwise indicated.

TABLE 1

| Parts by weight per 100 parts of Polyurethane* | | | | | | |
|---|---|---|---|---|---|---|
| | Control | Experimental | | | | |
| Material | A | B | C | D | E | F |
| Polyurethane[1] | 100 | 100 | 100 | 100 | 100 | 100 |
| Molecular sieves[2] | 0.33 | 0.33 | 0.33 | 0.33 | 0.33 | 0.33 |
| Dioctyladapate[3] | 0 | 0 | 0 | 0 | 0 | 5.8 |
| Boron nitride, hexagonal(h-BN)[4] | 0 | 1.3 | 1.9 | 2.6 | 3.2 | 1.3 |

*parts by weight per 100 parts by weight of combination of polymeric polyol plus diisocyanate
[1]Product of 63.69 parts of polymeric polyester polyol and 36.31 parts of diisocyanate. The polymeric polyester polyol was a viscous liquid as Elastocast™ 72580R from BASF. The diisocyanate was MDI as Lupranate™ 5030 from BASF.
[2]Dried molecular sieves, a white powder, from the Alfa Aesar Company
[3]Plasticizer from Sigma Aldrich
[4]White fluffy powder from Momentive The following Table 2 illustrates physical properties of the polyurethanes of the Control Sample A and Experimental Samples B through F based upon the basic formulation of Table 1.

TABLE 2

| | Control | Experimental | | | | |
|---|---|---|---|---|---|---|
| Properties | A | B | C | D | E | F |
| Shore A hardness (23° C.) | 70 | 72 | 73 | 74 | 74 | 70 |
| Modulus (300%), MPa | 6 | 5.8 | 6.8 | 5.7 | 6 | 5 |
| Tensile strength, MPa | 14 | 23 | 26 | 25 | 24 | 20 |
| Elongation, at break (%) | 463 | 477 | 592 | 644 | 609 | 625 |
| Grosch abrasion rate[1], (high severity test, gm/km) | 315 | 305 | 325 | 347 | 348 | 320 |
| Tear strength[2], (N/mm) | 58 | 60 | 61 | 63 | 63 | 56 |

[1]The Grosch abrasion rate, reported in terms of mg/km, can be run on a LAT-100 Abrader and is measured in terms of mg/km of polyurethaner abraded away. The test polyurethane sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons, 2° slip angle, disk speed of 40 km/hr for a distance of 7,500 meters; a medium abrasion severity test may be run, for example, at a load of 40 Newtons, 6° slip angle, disk speed of 20 km/hr and distance of 1,000 meters; a high abrasion severity test may be run, for example, at a load of 70 Newtons, 12° slip angle, disk speed of 20 km/hr and distance of 250 meters; and an ultra-high abrasion severity test may be run, for example, at a load of 70 Newtons, 16° slip angle, disk speed of 20 km/hr and distance of 500 meters.
[2]Data obtained according to a tear strength (peal adhesion), or tear resistance test, ASTM test D624

From Table 2 it can be seen that the tensile strength property of the polyurethanes of Experimental Samples G through E progressively beneficially increased by the progressive increase of the addition of the h-BN as compared to the polyurethane of Control Sample A without the h-BN addition.

For the polyurethane of Experimental Sample F, the tensile strength also significantly increased over the tensile strength of the Control Sample A, although to a lesser extent than the tensile strength of Experimental Samples B through E, apparently because of the significant addition of the dioctyladipate plasticizer.

While the beneficial increase of tensile strengths of the polyurethanes may not be completely understood, it is envisioned that the nitrogen atoms of the h-BN can undergo a hydrogen bonding with hydrogen atoms contained on the polyurethane to thereby promote a beneficial reinforcement of the polyurethanes.

EXAMPLE II

Additional polyurethane reaction mixtures are prepared to evaluate an inclusion of a dispersion of particulate h-BN in a polyurethane reaction mixture comprised of primary diamine (sodium chloride salt thereof and therefore a chemically blocked diamine) and pre-polymer comprised of polyisocyanate terminated polymeric polyester polyol.

The polymeric polyester polyol containing the h-BN (without molecular sieve desiccant) was degassed under vacuum to remove any residual trapped air and the reaction mixture cast into a suitable mold and allowed to react (upon being initially heated to unblock the primary amine reactant) to form a molded (shaped) polyurethane product containing a dispersion of h-BN reinforcement.

For this evaluation, a Control Sample was prepared comprised of reacting a liquid reaction mixture comprised of primary diamine and isocyanate terminated pre-polymer of polyisocyante and polymeric polyester polyol without h-BN to form a polyurethane product.

Experimental rubber Samples A through H were prepared comprised of the primary diamine and pre-polymer of the Control Sample but with added h-BN in amounts ranging from 2 to 5 parts by weight of the particulate h-BN. The h-BN was blended with the primary diamine.

The polyurethane is referred to as being "hot cast" in a sense of heating to activate the primary diamine reactant.

The components of the polyurethane reaction mixture are reported in the following Table 3 in terms of weight percent of the polyurethane of the polyurethane containing product unless otherwise indicated.

unknown, it is believed likely than a small amount of air (for example, a small air bubble) may have been present in the polyurethane mixture to thereby prevent its optional polyurethane formation.

While the beneficial increase of tensile strengths, as well as the beneficial reduction in Grosch abrasion rates of the polyurethanes, may not be completely understood, it is envisioned that the nitrogen atoms of the h-BN can undergo a hydrogen bonding with hydrogen atoms contained on the polyurethane to thereby promote a beneficial reinforcement of the polyurethane.

Therefore, it is concluded that the addition of the h-BN to the polyurethane reaction mixtures in both Examples I and II resulted in a beneficial promotion of reinforcement of the polyurethanes.

TABLE 3

Hot Cast Polyester Urea System Reaction Mixture
(Parts by weight per 100 parts Polyurethane)*

| Material | Control | A | B | C | D | E | F | G | H |
|---|---|---|---|---|---|---|---|---|---|
| Polyurethane[6] | 100 | 100 | 100 | 100 | 100 | 100 | 100 | 100 | 100 |
| Dioctyladipate[7] | 0 | 4.1 | 4.1 | 4.1 | 4.1 | 4.1 | 4.1 | 4.1 | 4.1 |
| Boron nitride, hexagoneal (h-BN)[8] | 0 | 0 | 0.23 | 0.45 | 0.68 | 0.9 | 1.1 | 1.4 | 4.5 |

*Polyurethane component as diamine reacted with isocynate terminated polyol
[6]100 parts by weight polyurethane (polyureaurethane) as a product of 90.22 parts by weight isocyanate terminated polyester polyol and 9.78 parts by weight primary diamine. The isocyanate terminated polymeric polyester polyol is provided as Duracast S700 ™, a viscous liquid product from Chemtura Corporation. The primary diamine curative is provided as Duracure C₃LF ™ from Chemtura Corporation.
[7]Plasticizer from Sigma Aldrich
[8]White fluffy powder obtained from Momentive The following Table 4 illustrates physical properties of the polyurethanes of the Control Sample and Experimental Samples A through H based upon the basic formulation of Table 3.

TABLE 4

Hot Cast Polyester Urea System Properties

| Polyester Urea Property | Control | A | B | C | D | E | F | G | H |
|---|---|---|---|---|---|---|---|---|---|
| Shore A hardness (23° C.) | 72 | 70 | 71 | 71 | 71 | 67 | 68 | 70 | 72 |
| Modulus (300%), MPa | 4.4 | 4.1 | 4.1 | 4.2 | 4.1 | 4 | 4.4 | 4.4 | 4.2 |
| Tensile strength, (MPa) | 14.2 | 15.7 | 15.2 | 17.2 | 18.2 | 16.2 | 13.8 | 18.4 | 19 |
| Elongation at break (%) | 922 | 995 | 955 | 903 | 998 | 899 | 785 | 834 | 964 |
| Grosch abrasion rate (high severity test) (mg/km) | 928 | 354 | 362 | 384 | 381 | 353 | 471 | 416 | 453 |
| Tear strength, N/mm | 59 | 60 | 58 | 56 | 56 | 53 | 55 | 55 | 55 |

From Table 4 it can be seen that that the tensile strength property of the polyurethane products of Experimental Samples B through E, as well as G and H, progressively beneficially increased by the progressive increase of the addition of the h-BN as compared to the polyurethane product of the Control Sample without the h-BN addition. It is noted that the Grosch abrasion rate was also beneficially reduced as compared to the Control Sample.

For the polyurethane product of Experimental Sample A, also without an addition of h-BN, the tensile strength beneficially increased, as well as Grosch Abrasion rate being beneficially reduced, perhaps due to the miniscule addition of the dioctyladipate plasticizer which might have undergone a degree of hydrogen bonding with the polyurethane.

For the polyurethane of Experimental Sample F, both the tensile strength and elongation properties were reduced as compared to the Control Sample. While the cause is While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A method of preparing a particulate layered hexagonally crystalline boron nitride (h-BN) reinforced polyurethane which comprises:
   (A) preparing a polyurethane reaction mixture by:
      (1) blending h-BN with polymeric polyol comprised of at least one of polyether polyol and polyester polyol to form a composite thereof, followed by blending an organic diisocyanate with said composite, or (2) blending h-BN with an isocyanate terminated pre-polymer of organic diisocyanate and polymeric polyol comprised of at least one of polyether polyol and polyester polyol to form a composite thereof, followed by blending a primary aliphatic diamine with said composite, and (B) allowing said polyurethane reaction mixture to react to form a polyurethane product containing a dispersion of h-BN reinforcement, wherein said polymeric polyol is free of carbon-to-carbon double bonds.

2. The method of claim 1 which comprises preparing a polyurethane reaction mixture by blending said h-BN with polymeric polyol comprised of at least one of polyether polyol and polyester polyol to form a composite thereof, followed by blending an organic diisocyanate with said composite and allowing said polyurethane reaction mixture to react to from a polyurethane product containing a dispersion of h-BN reinforcement.

3. The method of claim 1 which comprises preparing a polyurethane reaction mixture by blending said h-BN with an isocyanate terminated pre-polymer of organic diisocyanate and polymeric polyol comprised of at least one of polyether polyol and polyester polyol to form a composite thereof, followed by blending a primary aliphatic diamine with said composite, and allowing said polyurethane reaction mixture to react to form a polyurethane product containing a dispersion of h-BN reinforcement.

4. The method of claim 1 which comprises casting said polyurethane reaction mixture into a suitable mold cavity and allowing said polyurethane reaction mixture to react to form a polyurethane containing a dispersion of said h-BN comprised of at least one of a tire and tire with a component thereof.

* * * * *